(12) United States Patent
Matsumoto et al.

(10) Patent No.: US 12,028,243 B2
(45) Date of Patent: Jul. 2, 2024

(54) ROUTE CONTROL APPARATUS, ROUTE CONTROL METHOD AND PROGRAM

(71) Applicant: Nippon Telegraph and Telephone Corporation, Tokyo (JP)

(72) Inventors: Arifumi Matsumoto, Musashino (JP); Takuto Kimura, Musashino (JP); Aomi Jokoji, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 340 days.

(21) Appl. No.: 17/630,208

(22) PCT Filed: Jul. 30, 2020

(86) PCT No.: PCT/JP2020/029296
§ 371 (c)(1),
(2) Date: Jan. 26, 2022

(87) PCT Pub. No.: WO2021/020525
PCT Pub. Date: Feb. 4, 2021

(65) Prior Publication Data
US 2022/0286386 A1    Sep. 8, 2022

(30) Foreign Application Priority Data
Aug. 1, 2019   (JP) .................... 2019-142407

(51) Int. Cl.
*H04L 45/302* (2022.01)
(52) U.S. Cl.
CPC ................. *H04L 45/302* (2013.01)
(58) Field of Classification Search
CPC .................................................. H04L 45/302
See application file for complete search history.

(56) References Cited

U.S. PATENT DOCUMENTS

| | | | | |
|---|---|---|---|---|
| 7,269,657 B1 * | 9/2007 | Alexander | ............ | H04L 47/822 709/227 |
| 8,289,845 B1 * | 10/2012 | Baldonado | .............. | H04L 43/16 709/239 |

(Continued)

FOREIGN PATENT DOCUMENTS

| | | |
|---|---|---|
| JP | 2005057487 | 3/2005 |
| JP | 2006246205 | 9/2006 |

OTHER PUBLICATIONS

Jokoji et al, "Revealing Benefits of Quality-based Routing," Technical Report of IEICE, Apr. 18, 2019, 6 pages.

(Continued)

*Primary Examiner* — Ayaz R Sheikh
*Assistant Examiner* — Tarell A Hampton
(74) *Attorney, Agent, or Firm* — Fish & Richardson P.C.

(57) ABSTRACT

A routing control device of the present invention includes: a storage unit that stores, for each IP address block, a next hop, information on a route to the IP address block, and quality information regarding the route; a quality requirement determination unit that receives communication data bound for a communication destination host and determines a quality requirement of the communication data; and a next hop selection unit that references the storage unit and selects a next hop for the communication data based on quality information regarding a route to an IP address block to which an IP address of the communication destination host belongs and the quality requirement.

9 Claims, 7 Drawing Sheets

(56) References Cited

U.S. PATENT DOCUMENTS

| | | | | |
|---|---|---|---|---|
| 10,355,981 B1* | 7/2019 | Matthews | ............... | H04L 45/22 |
| 11,128,561 B1* | 9/2021 | Matthews | ........... | H04L 47/6255 |
| 2004/0008675 A1* | 1/2004 | Basso | .................... | H04L 45/54 |
| | | | | 711/216 |
| 2005/0195835 A1* | 9/2005 | Savage | ................ | H04L 45/245 |
| | | | | 370/401 |
| 2006/0120288 A1* | 6/2006 | Vasseur | .................. | H04L 45/50 |
| | | | | 370/235 |
| 2006/0268682 A1* | 11/2006 | Vasseur | ................ | H04L 47/728 |
| | | | | 370/242 |
| 2008/0310340 A1* | 12/2008 | Isozu | ..................... | H04L 45/10 |
| | | | | 370/328 |
| 2009/0025025 A1* | 1/2009 | Vleck | .............. | H04N 21/44224 |
| | | | | 725/14 |
| 2009/0175266 A1* | 7/2009 | Boucadair | ............ | H04L 45/302 |
| | | | | 370/352 |
| 2016/0294612 A1* | 10/2016 | Ravinoothala | .......... | H04L 45/64 |

OTHER PUBLICATIONS

Rekhter et al., "A Border Gateway Protocol 4 (BGP-4)," Network Working Group Request for Comments: 4271, Jan. 2006, 104 pages.

Yap et al., "Taking the Edge off with Espresso: Scale, Reliability and Programmability for Global Internet Peering," SIGCOMM '17, Aug. 21, 2017, 14 pages.

\* cited by examiner

| IP ADDRESS BLOCK | NEXT HOP | AS PATH | COMMUNICATION QUALITY (LATENCY) | COMMUNICATION QUALITY (THROUGHPUT) |
|---|---|---|---|---|
| 90.0.0.0/24 | AS20 | 20-30-90 | 100 msec | 100 Mbps |
| 90.0.0.0/24 | AS50 | 50-90 | 10 msec | 50 Mbps |
| 20.0.0.0/24 | AS20 | 20 | 40 msec | 200 Mbps |
| 30.0.0.0/24 | AS20 | 20-30 | 60 msec | 150 Mbps |
| 50.0.0.0/24 | AS50 | 50 | 5 msec | 80 Mbps |
| 10.0.0.0/24 | Self | – | 1 msec | 200 Mbps |

| IP ADDRESS BLOCK | NEXT HOP | AS PATH | COMMUNICATION QUALITY (LATENCY) | COMMUNICATION QUALITY (THROUGHPUT) |
|---|---|---|---|---|
| 10.0.0.0/24 | AS10 | 10 | 50 msec | 100 Mbps |
| 30.0.0.0/24 | AS30 | 30 | 50 msec | 100 Mbps |
| 50.0.0.0/24 | AS50 | 50 | 50 msec | 100 Mbps |
| 90.0.0.0/24 | AS30 | 30-90 | 100 msec | 50 Mbps |
| 90.0.0.0/24 | AS50 | 50-90 | 150 msec | 80 Mbps |
| 20.0.0.0/24 | Self | - | 1 msec | 200 Mbps |

ROUTE CONTROL APPARATUS, ROUTE CONTROL METHOD AND PROGRAM

CROSS-REFERENCE TO RELATED APPLICATIONS

This application is a National Stage application under 35 U.S.C. § 371 of International Application No. PCT/JP2020/029296, having an International Filing Date of Jul. 30, 2020, which claims priority to Japanese Application Serial No. 2019-142407, filed on Aug. 1, 2019. The disclosure of the prior application is considered part of the disclosure of this application, and is incorporated in its entirety into this application.

TECHNICAL FIELD

The present invention relates to network routing control.

BACKGROUND ART

A routing control protocol called BGP (Border Gateway Protocol) is used in current routing control between organizations on the Internet, that is to say routing control between ASs (Autonomous Systems) (NPL 1).

In BGP, ASs advertise the IP address blocks they use, and advertising information is repeatedly transferred on the topology between ASs connected in a mesh such that IP address blocks and route information for reaching them can be exchanged with other organizations connected to the Internet.

The Internet is made up of A S groups that are connected in a mesh, and although there are often multiple communication routes between two communicating hosts, in current routing control by BGP, it is common that only one of them is selected and used.

CITATION LIST

Non Patent Literature

[NPL 1] "Border Gateway Protocol 4 (BGP-4)" RFC 4271.
[NPL 2] K. Yap, M. Motiwala, J. Rahe, S. Padgett, M. Holliman, G. Baldus, M. Hines, T. Kim, A. Narayanan, A. Jain, V. Lin, C. Rice, B. Rogan, A. Singh, B. Tanaka, M. Verma, P. Sood, M. Tariq, M. Tierney, D. Trumic, V. Valancius, C. Ying, M. Kallahalla, B. Koley, and A. Vandat, "Taking the edge off with espresso: Scale, reliability and programmability for global internet peering," 2017. http://dl.acm.org/ftgateway.cfm?id=3098854&ftid=1898911&dwn=1&CFID=776908660&CFTOKEN=29525737

SUMMARY OF THE INVENTION

Technical Problem

In the above-described routing control performed using BGP, the communication quality of communication routes is not taken into consideration, and therefore the communication quality of the route selected when transferring communication data is not always good.

The present invention has been made in view of the above points, and an object of the present invention is to provide technology according to which, when selecting a communication route for a communication data transfer destination, it is possible to select a communication route that has a better communication quality than the communication quality of a communication route selected by conventional technology.

Means for Solving the Problem

One aspect of the disclosed technology provides a routing control device including:
a storage unit configured to store, for each IP address block, a next hop, information on a route to the IP address block, and quality information regarding the route;
a quality requirement determination unit configured to receive communication data bound for a communication destination host and determine a quality requirement of the communication data; and
a next hop selection unit configured to reference the storage unit and select a next hop for the communication data based on quality information regarding a route to an IP address block to which an IP address of the communication destination host belongs and the quality requirement.

Effects of the Invention

According to the disclosed technology, it is possible to provide technology according to which, when selecting a communication route for a communication data transfer destination, it is possible to select a communication route that has a better communication quality than the communication quality of a communication route selected by conventional technology.

DESCRIPTION OF EMBODIMENTS

Hereinafter, an embodiment (the present embodiment) of the present invention will be described with reference to the drawings. The embodiment described below is merely an example, and the embodiments to which the present invention are applied are not limited to the following embodiment.

(Device Configuration)

Figure 1:
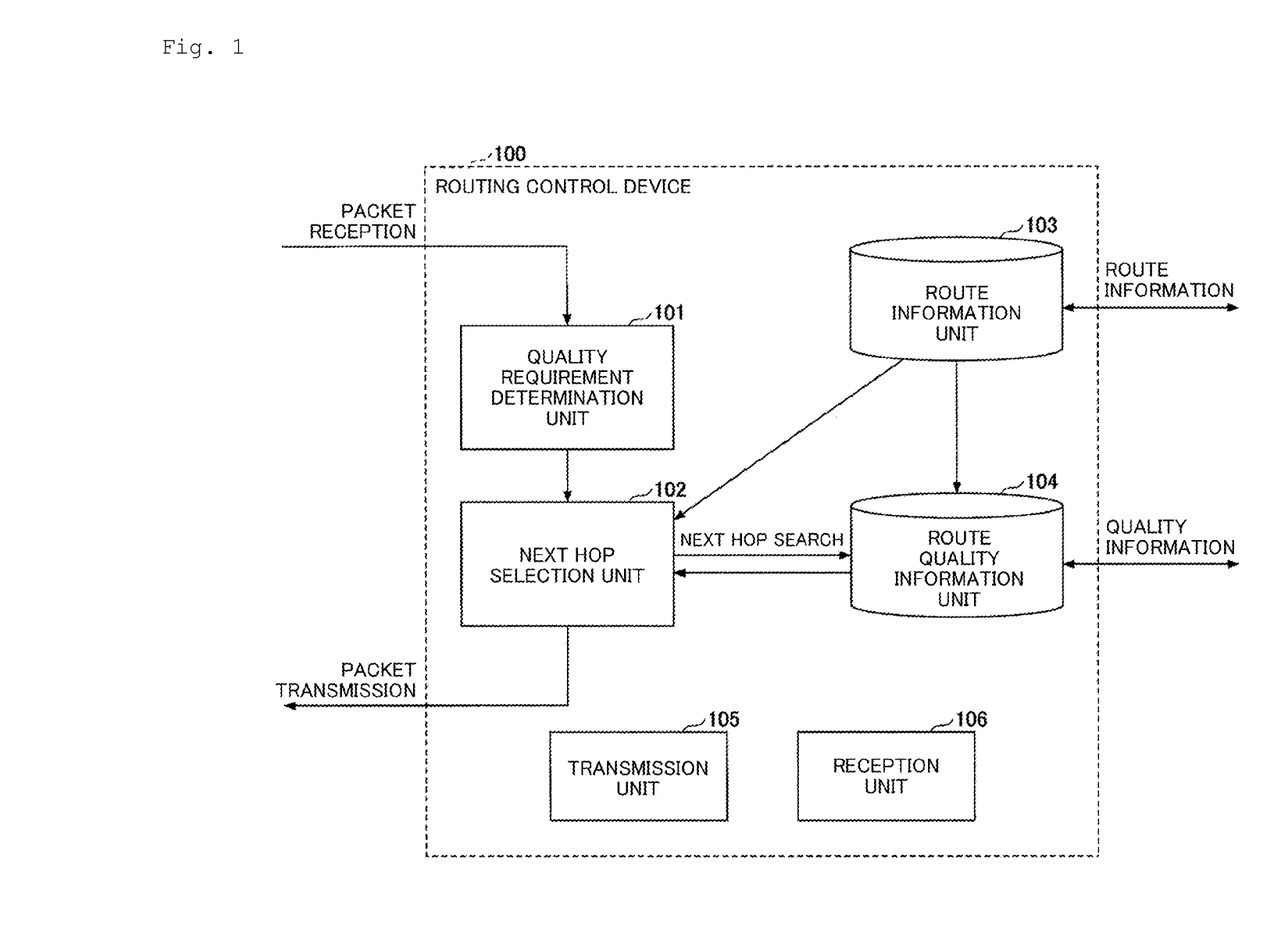
FIG. 1 is a diagram showing a configuration example of a routing control device.

FIG. 1 is a diagram showing a configuration example of a routing control device 100 according to the present embodiment. The routing control device 100 is a device used as a BGP router in each AS, for example.

As shown in FIG. 1, the routing control device 100 includes a quality requirement determination unit 101, a next hop selection unit 102, a route information unit 103, a route quality information unit 104, a transmission unit 105, and a reception unit 106.

The quality requirement determination unit 101 determines a communication service type based on received communication data (may be called packets), and determines a quality requirement that corresponds to the service. The next hop selection unit 102 determines a transfer destination (next hop) with use of route setting information included in the route quality information unit 104 and the route information unit 103, and transmits communication data in a direction that corresponds to the determined next hop via the transmission unit 105.

The route information unit 103 includes a storage unit for storing route information and a function for exchanging route information with other devices. The route information includes, for example, IP address blocks and AS paths (AS lists) indicating routes to reach the ASs of the IP address blocks. The route quality information unit 104 includes a storage unit that stores quality information for each route to a destination.

The transmission unit 105 transmits communication data, and the reception unit 106 receives communication data. For convenience, FIG. 1 has been drawn such that the quality requirement determination unit 101, the next hop selection unit 102, the route information unit 103, and the route quality information unit 104 also perform data transmission and reception, but actual transmission and reception are performed by the transmission unit 105 and the reception unit 106. Details of operations of the quality requirement determination unit 101 and the next hop selection unit 102 will be described later.

The routing control device 100 can be realized by causing a computer (including a communication device such as a router) to execute a program describing the processing content described in the present embodiment, for example.

In other words, the routing control device 100 can be realized by executing a program corresponding to the processing executed by the routing control device 100 with use of hardware resource such as a CPU and a memory built in a computer. The program can be recorded, stored, and distributed on a computer-readable recording medium (e.g., a portable memory). It is also possible to provide the program through a network such as the Internet or e-mail.

Figure 2:
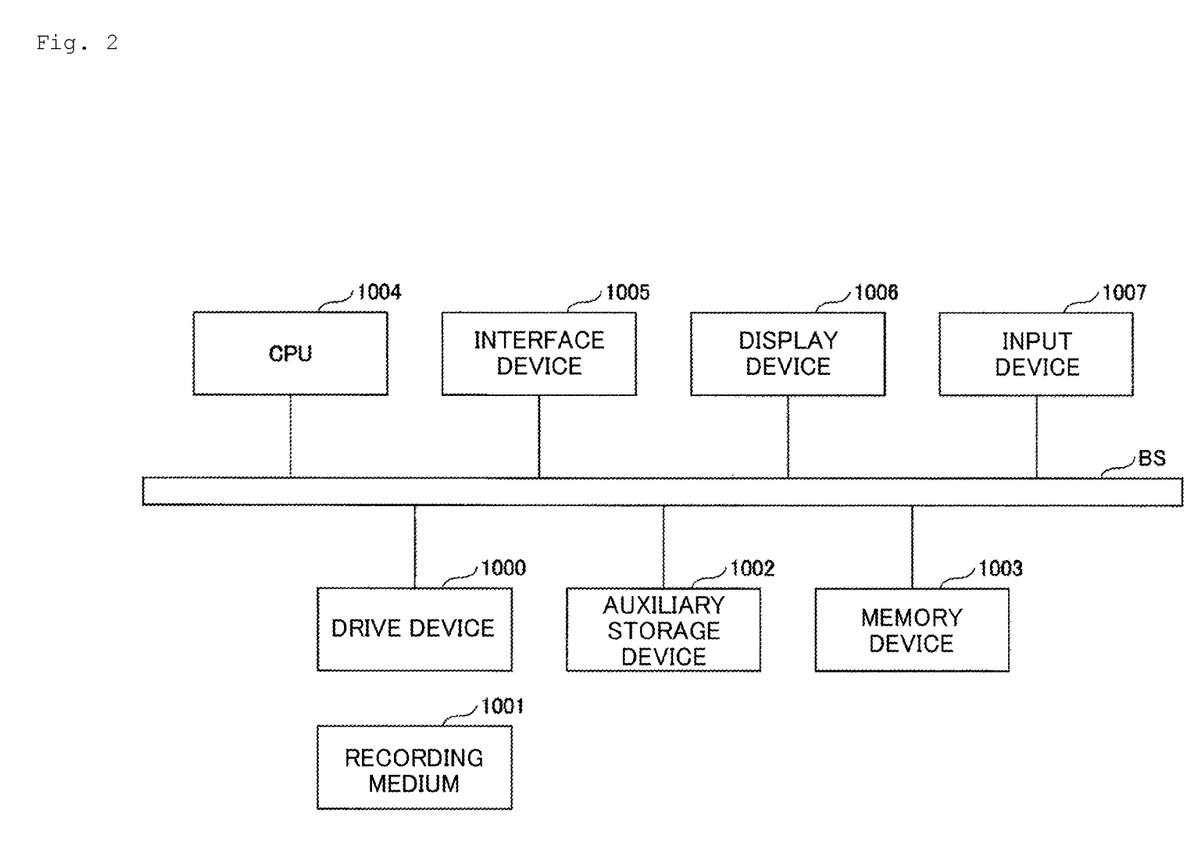
FIG. 2 is a diagram showing a hardware configuration example of the routing control device.

FIG. 2 is a diagram showing a hardware configuration example of the computer according to the present embodiment. The computer of FIG. 2 includes a drive device 1000, an auxiliary storage device 1002, a memory device 1003, a CPU 1004, an interface device 1005, a display device 1006, an input device 1007, and the like, which are connected to each other by a bus B.

The program that realizes the processing in the computer is provided using, for example, a recording medium 1001 such as a CD-ROM or a memory card. When the recording medium 1001 storing the program is set in the drive device 1000, the program is installed from the recording medium 1001 to the auxiliary storage device 1002 via the drive device 1000. Note that the program does not necessarily need to be installed from the recording medium 1001, and may be downloaded from another computer via a network. The auxiliary storage device 1002 stores the installed program and also stores necessary files and data.

When a program startup instruction is given, the memory device 1003 reads and stores the program from the auxiliary storage device 1002. The CPU 1004 realizes functions pertaining to the routing control device 100 in accordance with the program stored in the memory device 1003. The interface device 1005 is used as an interface for connecting to a network. The display device 1006 displays a programmatic GUI (Graphical User Interface) and the like. The input device 1007 is constituted by a keyboard, a mouse, buttons, a touch panel, or the like, and is used for inputting various operation instructions.

(Operation Example of Routing Control Device 100)

Next, an operation example of the routing control device 100 will be described. In the following operation example, it is assumed that each AS is provided with the routing control device 100 that is used as a BGP router.

It is assumed that the route information units 103 of the routing control devices 100 have performed routing control using the normal BGP in advance. Specifically, it is assumed that each routing control device 100 receives route information from adjacent routing control devices 100 and advertises the IP address block used in its own AS to adjacent ASs.

When an AS that has received route information from an adjacent AS provides external connectivity to the transmission source AS, the AS forwards and advertises its IP address block to other ASs as well, and also advertises all route information that has already been received to the transmission source AS.

Figure 3:
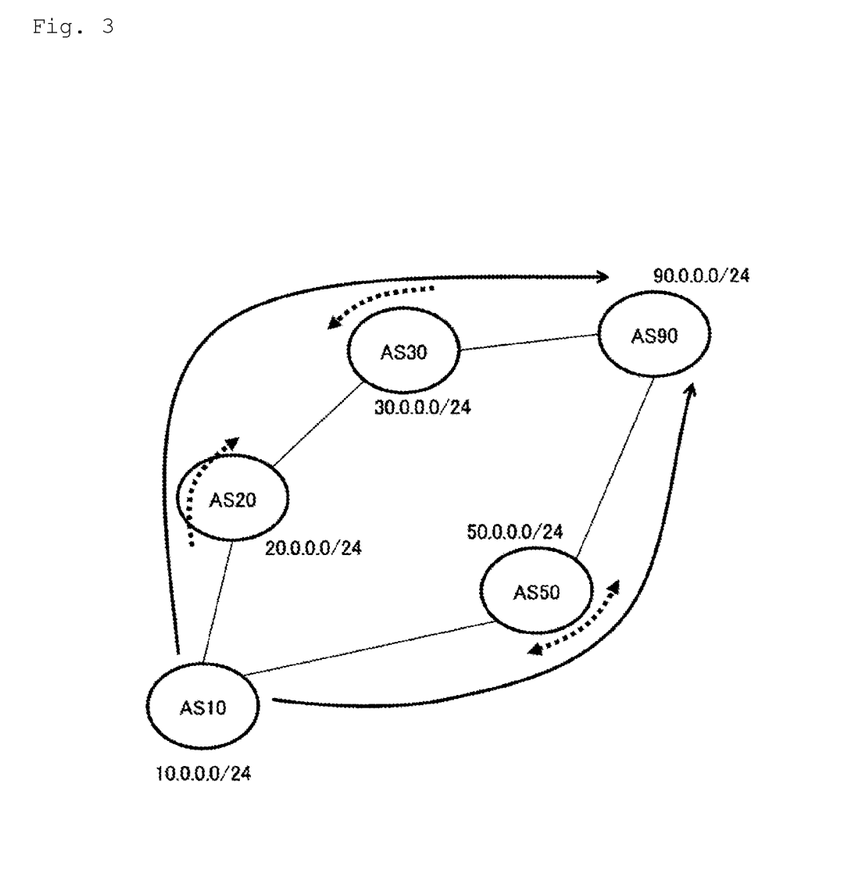
FIG. 3 is a diagram showing a first example of a network according to an embodiment.

FIG. 3 shows a first example of a network according to the present embodiment. As shown in FIG. 3, the network of the first example has an AS 10, an AS 20, an AS 30, an AS 50, and an AS 90, and the IP address blocks shown in FIG. 3 are used in the ASs.

In the first example of the network, the AS 20 and the AS 50 each provide external connectivity to the AS 10; the AS 30 and the AS 50 each provide external connectivity to the AS 90; and the AS 20 and the AS 30 provide external connectivity to each other. As a result, there are two next hop ASs, namely the AS 20 and the AS 50, along the transfer of communication data from the AS 10 to the AS 90.

Figure 4:
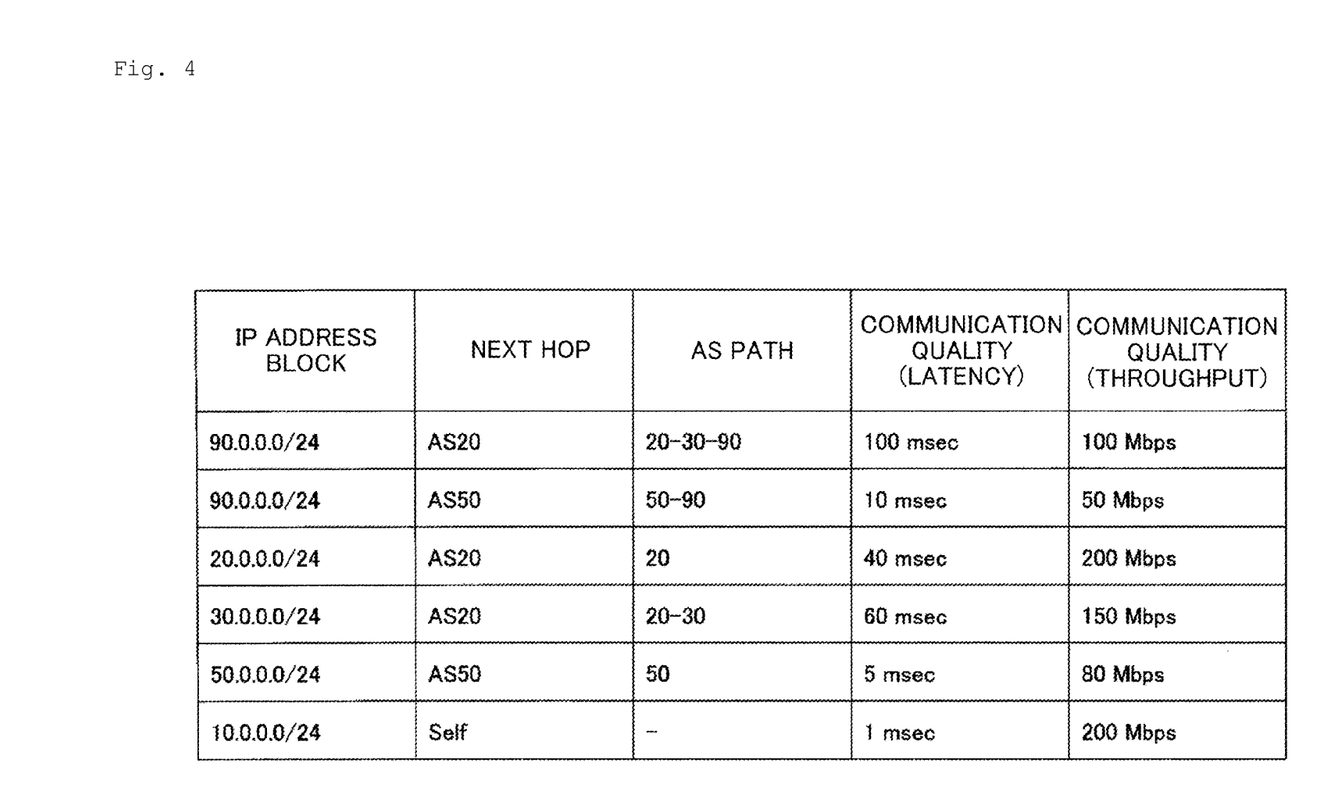
FIG. 4 is a diagram showing content held by a route quality information unit 104 of an AS 10 in the first example of the network shown in FIG. 3.

At this time, FIG. 4 shows an example of route quality information stored in the route quality information unit 104 of the routing control device 100 in the AS 10.

As shown in FIG. 4, the route quality information unit 104 stores destination IP address blocks, transfer destination ASs (next hops) that can be used when communication data arrives at the corresponding destination IP address block, AS lists (may be called AS paths) that are each a list of ASs through which communication data passes at that time, and communication quality values (latency and throughput) when performing communication with the IP address block. Note that the use of latency and throughput as communication quality values is one example. Either latency or throughput may be used, or a quality indicator different other than latency and throughput may be used.

To obtain the communication quality shown in FIG. 4, the routing control device 100 of the AS 10 may perform measurement for each destination IP address block on each route, or communication quality values measured by an external measuring device may be input to the routing control device 100, or communication quality values may be extracted from communication data that passes through the routing control device 100.

In the routing control device 100, when the reception unit 106 receives communication data that is to be transferred, the quality requirement determination unit 101 determines a quality requirement of the communication data. For example, if the communication data is communication data for a voice communication service, the quality requirement is determined to be "low latency", and if the communication data requires communication bandwidth such as in the case of a video service, the quality requirement is determined to be "high throughput".

Figure 5:
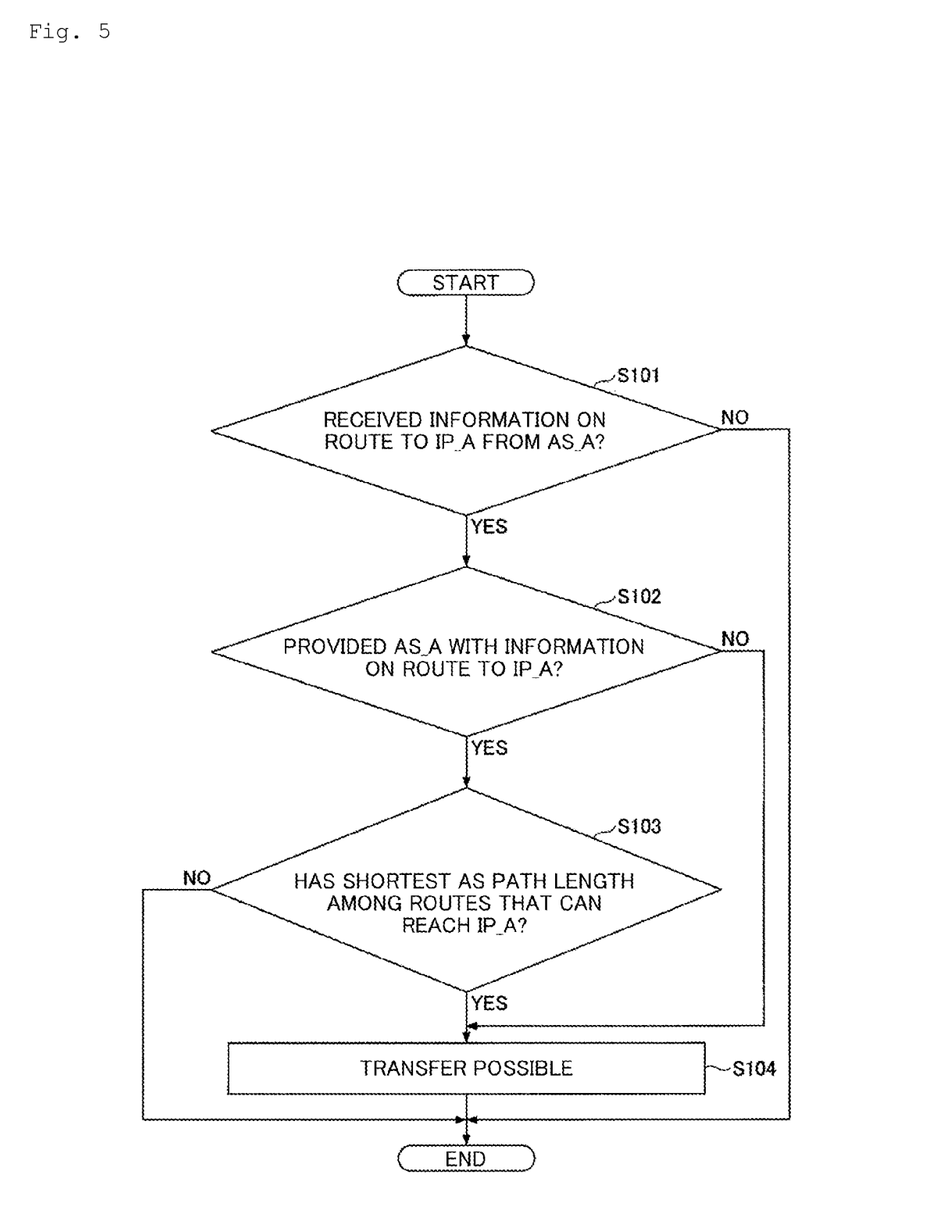
FIG. 5 is a diagram showing a determination flow in a next hop selection unit 102.

Next, the next hop selection unit 102 selects the next hop AS (hereinafter, referred to as the next hop) that is to be the transfer destination of the communication data. FIG. 5 shows a determination flow for determining whether or not communication data whose destination address is IP_A can be transferred to an AS_A, which is an adjacent AS that is a next hop candidate. Hereinafter, an example of operations of the next hop selection unit 102 will be described with reference to the procedure shown in FIG. 5. In the following, first, an operation example related to the first example of the network shown in FIG. 3 will be described.

Operation Example for First Example of Network

Here, as a specific example, envision the case where the routing control device 100 of the AS 10 transmits communication data to the destination address 90.0.0.1.

The next hop selection unit 102 references the information stored in the route quality information unit 104, and because the destination address 90.0.0.1 is included in the IP address block 90.0.0.0/24, there are two entries, and there are two next hop candidates, namely the AS 20 and the AS 50.

In this case, the next hop selection unit 102 executes the processing of the determination flow shown in FIG. 5 individually for the AS 20 and the AS 50.

In step S101 of FIG. 5, the next hop selection unit 102 determines whether or not the routing control device 100 has received information on the route to IP_A (destination address) from the AS_A (the adjacent AS that is next hop candidate).

In this example, the routing control device 100 of the AS 10 receives route information related to 90.0.0.1 from both the AS 20 and the AS 50. In other words, the existence of IP address block 90.0.0.0/24 entries whose next hops are the AS 20 and the AS 50 means that route information from both the AS 20 and the AS 50 to IP address block 90.0.0.0/24 (route information regarding 90.0.0.1) has been received. The determination result is "Yes" for both the AS 20 and the AS 50.

If the determination result in step S101 is "Yes", processing moves to step S102. If the determination result in step S101 is "No", transfer is not possible, and processing is ended.

In step S102, the next hop selection unit 102 determines whether or not the routing control device 100 has provided the AS_A with information on the route to IP_A.

In this example, the next hop selection unit 102 checks whether or not the routing control device 100 is advertising an IP address block that includes the destination IP address 90.0.0.1 to the AS 20 and the AS 50.

As mentioned above, the AS 10 does not provide external connectivity to the AS 20 and the AS 50, and therefore only advertises 10.0.0.0/24, which is the IP address block used by the AS 10. Therefore, the determination in step S102 is "No" for both the AS 20 and the AS 50.

If the determination result in step S102 is "No", processing moves to step S104. In this example, the next hop selection unit 102 determines that both the AS 20 and the AS 50 are transferable next hops (candidates). If there is only one transferable next hop candidate, that next hop is selected.

As described above, if there are a plurality of transferable next hop candidates, a route that meets the quality requirement determined by the quality requirement determination unit 101 is selected using estimated quality values obtained for cases of selecting the routes described in the route quality information unit 104, and communication data is transferred to the next hop on the selected route.

In this example, if the quality requirement is "low latency", the AS 50 having the lower latency is selected as the next hop.

If the determination of step S102 is "Yes", processing moves to step S103. In step S103, the next hop selection unit 102 determines whether or not the next hop candidate has the shortest AS path length (there may be a plurality of them) among the routes that can reach IP_A. A case of executing step S103 will be described in the operation example of the following second example of the network.

Operation Example for Second Example of Network

Figure 6:
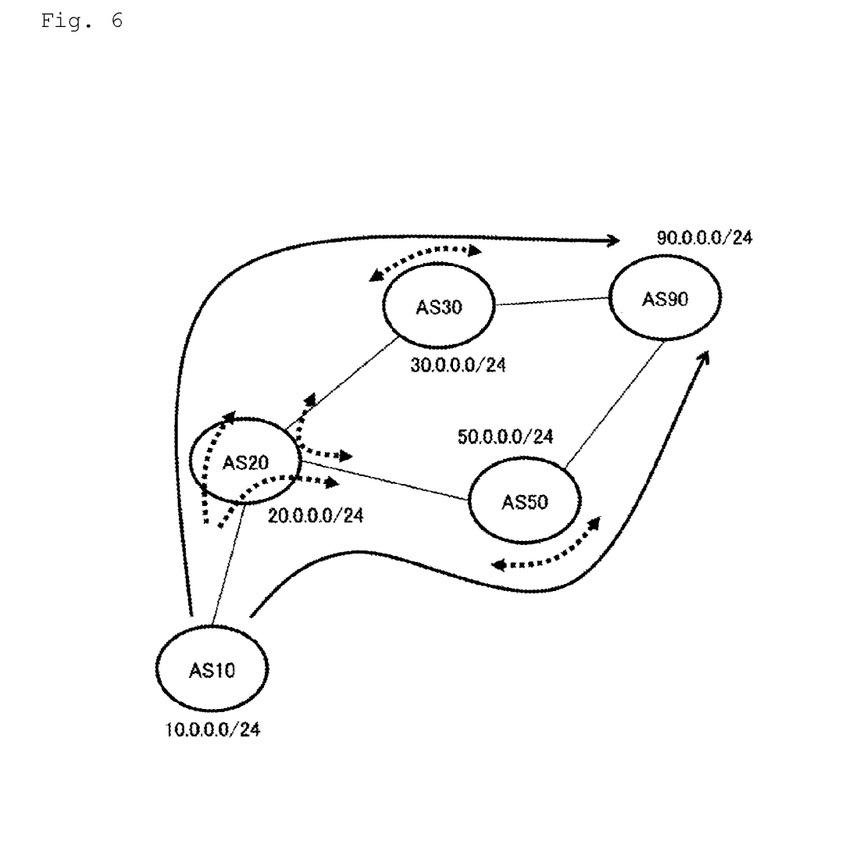
FIG. 6 is a diagram showing a second example of the network according to the embodiment.

FIG. 6 shows a second example of the network. Here, in the below-described second example of the network shown in FIG. 6, the routing control device 100 of the AS 20 transfers communication data that was transmitted from the AS 10 to the destination address 90.0.0.1.

In the second example of the network shown in FIG. 6, the AS 20 provides external connectivity to the AS 10, the AS 30, and the AS 50. In other words, the routing control device 100 of the AS 20 provides all of the received route information to the adjacent ASs (AS 10, AS 30, AS 50).

The AS 30 provides external connectivity to the AS 20 and the AS 90, and the AS 50 provides external connectivity to the AS 20 and the AS 90. At this time, the route quality information unit 104 in the AS 20 stores the information shown in FIG. 7.

Figure 7:
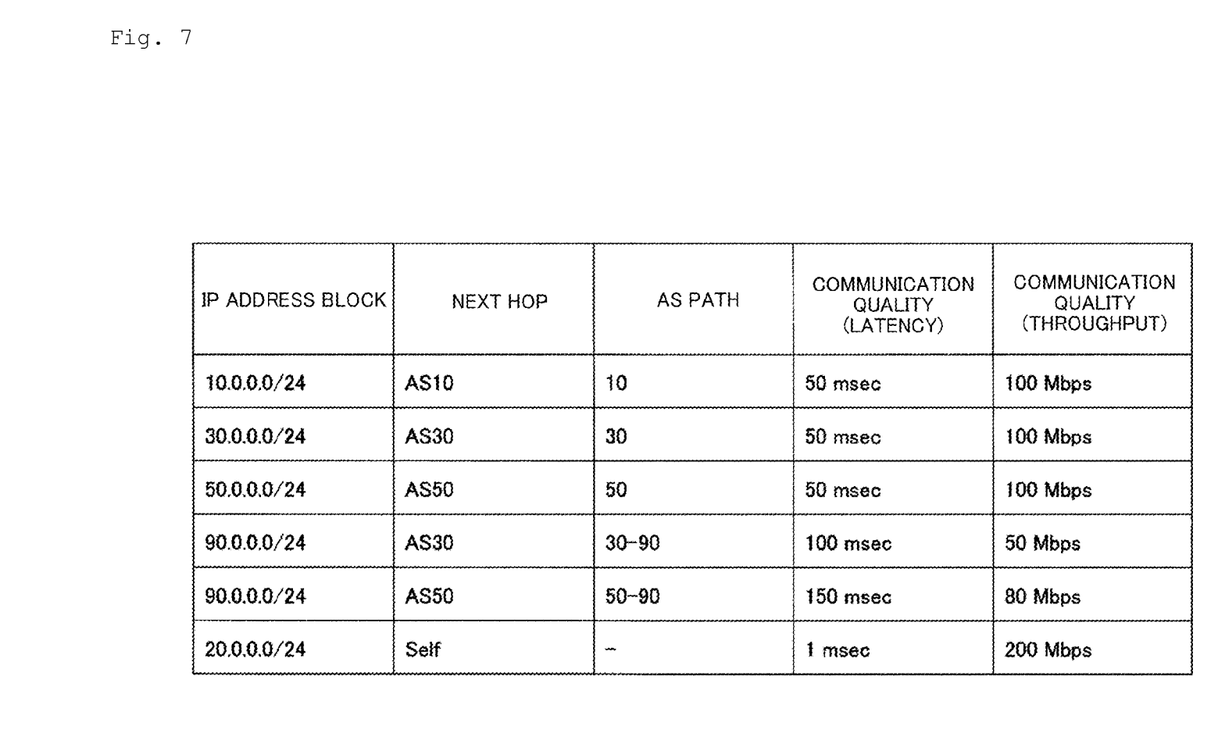
FIG. 7 is a diagram showing content held by the route quality information unit 104 of an AS 20 in the second example of the network shown in FIG. 6.

The next hop selection unit 102 references the information stored in the route quality information unit 104, and because the destination address 90.0.0.1 is included in the IP address block 90.0.0.0/24, there are two entries, and there are two next hop candidates, namely the AS 30 and the AS 50.

In this case, the next hop selection unit 102 executes the processing of the determination flow shown in FIG. 5 individually for the AS 30 and the AS 50, and determines whether or not communication data can be transferred to the next hop candidates.

In step S101 of FIG. 5, the next hop selection unit 102 determines whether or not the routing control device 100 has received information on the route to IP_A (destination address) from the AS_A (adjacent AS that is next hop candidate).

In this example, the routing control device 100 of the AS 20 receives route information related to 90.0.0.1 from both the AS 30 and the AS 50. In other words, since there are IP address block 90.0.0.0/24 entries whose next hops are the AS 30 and the AS 50, the determination result is "Yes" for both the AS 30 and the AS 50.

If the determination result in step S101 is "Yes", processing moves to step S102. If the determination result in step S101 is "No", transfer is not possible, and processing is ended.

In step S102, the next hop selection unit 102 determines whether or not the routing control device 100 has provided the AS_A with information on the route to IP_A.

In this example, the AS 20 provides external connectivity to the AS 30 and the AS 50, and therefore also provides route information regarding the IP address block 90.0.0.0/24 (the IP address block to which 90.0.0.1 belongs); the determination result is "Yes" for both the AS 30 and the AS 50, and processing moves to step S103.

In step S103, the next hop selection unit 102 determines whether or not the route to which the next hop candidate belongs has the shortest AS path length (there may be a plurality of them) among the routes that can reach IP_A.

In this example, the AS path is 30-90 if the AS 30 is the next hop, and the AS path is 50-90 if the AS 50 is the next hop. In other words, since the AS path length (the number of ASs that are passed through) is two for both A30 and A50, both are the shortest, and "Yes" (transfer is possible in step S104) is determined for both of them.

Therefore, similarly to the case described above, the next hop that is to be the transfer destination is determined using the quality requirement determined by the quality requirement determination unit 101 and values stored in the route quality information unit 104. In this example, if the quality requirement is "low latency" for example, the AS 30 with the smaller latency is selected as the next hop.

Note that even if the obtained transferrable next hop candidates include one or more next hop candidates for which the determination result of step S102 in FIG. 5 is No and one or more next hop candidates for which the determination result of step S103 is "Yes", it is sufficient that the next hop that is to be the transfer destination is determined using the quality requirement and values stored in the route quality information unit 104.

Effects of Embodiment

As described above, in the present embodiment, the routing control device 100 uses quality information extracted from a past communication history or the like in order to predict the communication quality for a plurality of transfer destinations (next hops) that can be used for a communication destination host, and transfers data to a transfer destination that achieves better communication quality. Note that here, when determining the transfer destination, the prevention of a data transfer loop is ensured before the transfer destination is determined. The determinations made in steps S102 and S103 in FIG. 5 are for ensuring the prevention of a data transfer loop.

This makes it possible to achieve better communication quality than the communication quality that has been achieved in the past, and if quality requirements differ for various types of network services, it is possible to select a communication path that meets the quality requirement of the corresponding network service, thus making it possible to improve the communication quality while suppressing equipment investment cost.

Summary of Embodiments

At least the following routing control device, routing control method, and program are provided in embodiments of the present invention.

(Item 1)
A routing control device including:
  a storage unit configured to store, for each IP address block, a next hop, information on a route to the IP address block, and quality information regarding the route;
  a quality requirement determination unit configured to receive communication data bound for a communication destination host and determine a quality requirement of the communication data; and
  a next hop selection unit configured to reference the storage unit and select a next hop for the communication data based on quality information regarding a route to an IP address block to which an IP address of the communication destination host belongs and the quality requirement.

(Item 2)
The routing control device according to item 1,
wherein by referencing the storage unit, the next hop selection unit determines one or more next hop candidates, and selects, as the next hop for the communication data, a next hop candidate that belongs to a route that satisfies the quality requirement from among one or more next hop candidates through which the communication data can be transferred to the IP address block to which the IP address of the communication destination host belongs among the determined one or more next hop candidates.

(Item 3)
The routing control device according to item 2,
wherein for each next hop candidate, the next hop selection unit determines whether or not the routing control device has provided the next hop candidate with information on the route to the IP address block to which the IP address of the communication destination host belongs, and in a case where the routing control device has not provided the next hop candidate with the information, the next hop selection unit determines that the communication data can be transferred to the next hop candidate.

(Item 4)
The routing control device according to item 3,
wherein for each next hop candidate, in a case where the routing control device has provided the next hop candidate with the information on the route to the IP address block to which the IP address of the communication destination host belongs, the next hop selection unit determines whether or not the next hop candidate belongs to a shortest route among one or more routes that can reach the IP address block to which the IP address of the communication destination host belongs, and if the next hop candidate belongs to the shortest route, the next hop selection unit determines that the communication data can be transferred to the next hop candidate.

(Item 5)
A routing control method for execution by a routing control device that includes a storage unit that stores, for each IP address block, a next hop, information on a route to the IP address block, and quality information regarding the route, the method including:
  a quality requirement determination step of receiving communication data bound for a communication destination host and determining a quality requirement of the communication data; and
  a next hop selection step of referencing the storage unit and selecting a next hop for the communication data based on quality information regarding a route to an IP address block to which an IP address of the communication destination host belongs and the quality requirement.

(Item 6)
A program for causing a computer to function as the units of the routing control device according to any one of items 1 to 4.

Although embodiments have been described above, the present invention is not limited to these specific embodiments, and various modifications and changes can be made within the scope of the gist of the present invention described in the claims.

REFERENCE SIGNS LIST

100 Routing control device
101 Quality requirement determination unit
102 Next hop selection unit
103 Route information unit
104 Route quality information unit
105 Transmission unit
106 Reception unit
1000 Drive device
1002 Auxiliary storage device
1003 Memory device
1004 CPU
1005 Interface device
1006 Display device
1007 Input device

The invention claimed is:

1. A routing control device comprising:
a storage medium configured to store, for each IP address block, a next hop, information on a route to the IP address block, and quality information regarding the route;
a quality requirement determination unit, including one or more processors, configured to receive communication data bound for a communication destination host and determine a quality requirement of the communication data; and
a next hop selection unit, including one or more processors, configured to:
reference the storage medium and select a next hop for the communication data based on (i) quality information regarding a route to an IP address block to which an IP address of the communication destination host belongs and (ii) the quality requirement,
wherein selecting the next hop comprises:
determining one or more next hop candidates through which the communication data can be transferred to the IP address block,
for a first next hop candidate included in the one or more next hop candidates, determining whether or not the routing control device has provided the first next hop candidate with information on the route to the IP address block, and
in response to determining that the routing control device has not provided the first next hop candidate with the information, determining that the communication data can be transferred to the first next hop candidate as the next hop.

2. The routing control device according to claim 1, wherein by referencing the storage medium, the next hop selection unit is configured select, as the next hop for the communication data, a next hop candidate that belongs to a route that satisfies the quality requirement from among the one or more next hop candidates.

3. The routing control device according to claim 1, wherein the next hop selection unit is configured to:
in response to determining that the routing control device has provided a second next hop candidate with the information on the route to the IP address block,
determine whether or not the second next hop candidate belongs to a shortest route among one or more routes that can reach the IP address block, and
if the second next hop candidate belongs to the shortest route, determine that the communication data can be transferred to the second next hop candidate as the next hop.

4. A routing control method for execution by a routing control device that includes a storage medium that stores, for each IP address block, a next hop, information on a route to the IP address block, and quality information regarding the route, the method comprising:
receiving communication data bound for a communication destination host and determining a quality requirement of the communication data; and
referencing the storage medium and selecting a next hop for the communication data based on (i) quality information regarding a route to an IP address block to which an IP address of the communication destination host belongs and (ii) the quality requirement,
wherein selecting the next hop comprises:
determining one or more next hop candidates through which the communication data can be transferred to the IP address block,
for a first next hop candidate included in the one or more next hop candidates, determining whether or not the routing control device has provided the first next hop candidate with information on the route to the IP address block, and
in response to determining that the routing control device has not provided the first next hop candidate with the information, determining that the communication data can be transferred to the first next hop candidate as the next hop.

5. A non-transitory computer readable medium storing one or more instructions for causing a computer to function as a routing control device, that includes a storage medium that stores, for each IP address block, a next hop, information on a route to the IP address block, and quality information regarding the route, to execute:
receiving communication data bound for a communication destination host and determining a quality requirement of the communication data; and
referencing the storage medium and selecting a next hop for the communication data based on (i) quality information regarding a route to an IP address block to which an IP address of the communication destination host belongs and (ii) the quality requirement,
wherein selecting the next hop comprises:
determining one or more next hop candidates through which the communication data can be transferred to the IP address block,
for a first next hop candidate included in the one or more next hop candidates, determining whether or not the routing control device has provided the first next hop candidate with information on the route to the IP address block, and
in response to determining that the routing control device has not provided the first next hop candidate with the information, determining that the communication data can be transferred to the first next hop candidate as the next hop.

6. The routing control method according to claim 4, comprising:
referencing the storage medium; and
selecting, as the next hop for the communication data, a next hop candidate that belongs to a route that satisfies the quality requirement from among the one or more next hop candidates.

7. The routing control method according to claim 4, comprising:

in response to determining that the routing control device has provided a second next hop candidate with the information on the route to the IP address block, determining whether or not the second next hop candidate belongs to a shortest route among one or more routes that can reach the IP address block; and if the second next hop candidate belongs to the shortest route, determining that the communication data can be transferred to the second next hop candidate as the next hop.

8. The non-transitory computer readable medium according to claim 5, wherein the one or more instructions cause the computer to execute:

referencing the storage medium; and selecting, as the next hop for the communication data, a next hop candidate that belongs to a route that satisfies the quality requirement from among the one or more next hop candidates.

9. The non-transitory computer readable medium according to claim 5, wherein the one or more instructions cause the computer to execute:

in response to determining that the routing control device has provided a second next hop candidate with the information on the route to the IP address block, determining whether or not the second next hop candidate belongs to a shortest route among one or more routes that can reach the IP address block; and if the second next hop candidate belongs to the shortest route, determining that the communication data can be transferred to the second next hop candidate as the next hop.

* * * * *